(12) United States Patent
Lineberry

(10) Patent No.: US 11,123,974 B2
(45) Date of Patent: Sep. 21, 2021

(54) PRODUCING ARTICLES WITH MULTIPLE COLOR INKS

(71) Applicant: The Coca-Cola Company, Atlanta, GA (US)

(72) Inventor: Allen Lineberry, Liberty, NC (US)

(73) Assignee: THE COCA-COLA COMPANY, Atlanta, GA (US)

( * ) Notice: Subject to any disclaimer, the term of this patent is extended or adjusted under 35 U.S.C. 154(b) by 45 days.

(21) Appl. No.: 15/773,799

(22) PCT Filed: Nov. 7, 2016

(86) PCT No.: PCT/US2016/000111
§ 371 (c)(1),
(2) Date: May 4, 2018

(87) PCT Pub. No.: WO2017/078764
PCT Pub. Date: May 11, 2017

(65) Prior Publication Data
US 2018/0319152 A1     Nov. 8, 2018

Related U.S. Application Data

(60) Provisional application No. 62/251,753, filed on Nov. 6, 2015.

(51) Int. Cl.
*B41M 1/40* (2006.01)
*B41M 1/08* (2006.01)
(Continued)

(52) U.S. Cl.
CPC .............. *B41F 7/025* (2013.01); *B41F 17/22* (2013.01); *B41F 17/28* (2013.01); *B41M 1/08* (2013.01);
(Continued)

(58) Field of Classification Search
CPC ....................................................... B41M 1/16
See application file for complete search history.

(56) References Cited

U.S. PATENT DOCUMENTS 5,007,339 A    4/1991   Germann
5,205,216 A *   4/1993   Okamura ................ B41F 31/06
                                                                                                   101/350.5

(Continued)

FOREIGN PATENT DOCUMENTS

EP          1262321 A2    12/2002
JP          2006224585 A    8/2006
WO       2014201005 A1    12/2014

OTHER PUBLICATIONS

International Search Report and Written Opinion, PCT/US2016/000111, dated Feb. 8, 2017 (12 pp.).
(Continued)

*Primary Examiner* — Joshua D Zimmerman
(74) *Attorney, Agent, or Firm* — Eversheds Sutherland (US) LLP

(57) ABSTRACT

Functionality is disclosed herein for producing articles with multiple color inks. A method of decorating, printing, or otherwise producing articles with multiple color inks includes continuously refilling an ink reservoir with multiple color inks in a sequential manner, and continuously applying the multiple color inks from the ink reservoir onto articles of manufacture to create decorated articles of manufacture.

19 Claims, 7 Drawing Sheets

(51) Int. Cl.
  *B41M 1/14*    (2006.01)
  *B41F 7/02*    (2006.01)
  *H04W 4/02*    (2018.01)
  *B66B 1/46*    (2006.01)
  *B41F 17/22*   (2006.01)
  *B41F 17/28*   (2006.01)

(52) U.S. Cl.
  CPC ............... *B41M 1/14* (2013.01); *B41M 1/40* (2013.01); *B66B 1/468* (2013.01); *H04W 4/02* (2013.01); *B66B 2201/4615* (2013.01); *B66B 2201/4653* (2013.01)

(56) References Cited

U.S. PATENT DOCUMENTS

| | | | |
|---|---|---|---|
| 6,164,766 A | 12/2000 | Erickson | |
| 2002/0178954 A1* | 12/2002 | Hayashi | B41F 13/22 |
| | | | 101/487 |
| 2003/0082302 A1 | 5/2003 | Sharma | |
| 2005/0045053 A1 | 3/2005 | Finan | |
| 2008/0236431 A1* | 10/2008 | Smith | B41F 31/00 |
| | | | 101/485 |
| 2010/0229737 A1 | 9/2010 | Ouchi | |
| 2013/0098256 A1 | 4/2013 | Bonner | |

OTHER PUBLICATIONS

Extended European Search Report of European Application No. 16862603.4 dated Jul. 3, 2019.

* cited by examiner

PRODUCING ARTICLES WITH MULTIPLE COLOR INKS

BACKGROUND

Generally, printing indicia and graphical designs on beverage cans, such as aluminum or steel beverage cans, has been accomplished with a dry offset lithography process. The dry offset lithography process includes the application of a single color ink from a reservoir onto a portion of a printing plate. The printing plate is then used to transfer the ink to a blanket. Additionally, multiple other inks may also be transferred onto other portions of the blanket. However, the multiple other inks must be placed onto discrete portions of the blanket.

The discrete portions of the blanket are separate from one another, and are not in fluid communication. Furthermore, it is generally accepted that only a single color ink can be deposited onto any discrete portion of the blanket to maintain desired aesthetics of the beverage can. Additionally, the application of ink to the blanket in dry offset lithography generally does not include pre-application of a fountain solution. Instead, ink is applied in the discrete portions without utilization of water or another fountain solution to aid in ink application. Accordingly, the dry offset lithography process is sometimes termed a "wet-on-wet process" due to wet ink being applied to all discrete portions of the blanket.

Upon transfer of all required ink onto the blanket, the blanket is used to transfer the ink to a beverage can. For example, the blanket may be rolled onto the exterior surface of the beverage can such that the ink is deposited onto the exterior surface with reduced smearing. The beverage can having the applied ink may then be subjected to a curing process to harden or cure the applied ink. Thereafter, the beverage can may be processed by available means to fill, seal, and/or otherwise process the beverage can.

The disclosure made herein is presented with respect to these and other considerations.

DETAILED DESCRIPTION

Figure 1:
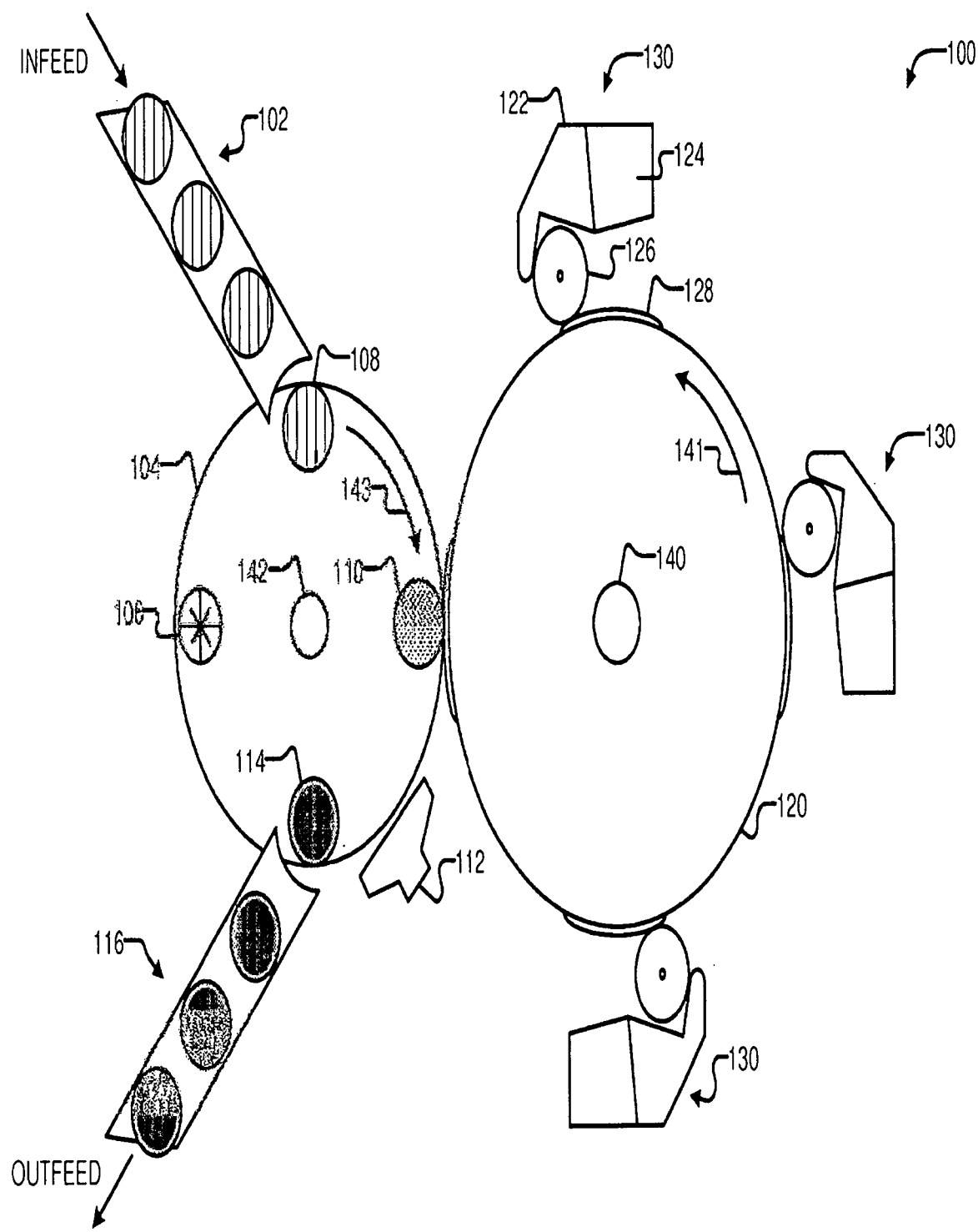
FIG. 1 is a schematic of a dry offset lithography printing mechanism, according to one configuration disclosed herein.

As used herein, the terms "printing mechanism", "printing press", "dry offset lithography printing mechanism", "dry offset lithography printing press", and other variants of these terms may refer to a mechanism that is operative to deposit ink onto a surface of an article of manufacture.

As used herein, the terms "product" and "beverage", and their pluralized forms, are used synonymously, and particular features of the invention should not be limited in scope by the use of either term.

As used herein, the term "article of manufacture" and variants thereof refer to any article capable of having ink deposited thereon. The ink can be deposited thereon for decorative purposes, sealing purposes, or any other suitable purpose.

As non-limiting examples, articles of manufacture may include beverage cans such as aluminum and steel beverage cans, flexible or deformable metal tubes, rigid metal tubes, cylindrical objects, plastic objects, film-based labelling, and other suitable articles of manufacture.

The following detailed description is directed to technologies for producing articles of manufacture with multiple color inks. Through an implementation of the various technologies disclosed herein, an article of manufacture may be decorated through an offset lithography process having more than a single color ink applied in at least one discrete portion of a printing blanket.

In one implementation, an ink reservoir of a printing mechanism is filled with a first color ink to a full threshold level. Thereafter, the printing mechanism is disposed to print articles using the first color ink. Upon the level of the ink reservoir depleting to a predetermined or desired low threshold, a second color ink is used to fill the ink reservoir from the low threshold to the full threshold level. The printing mechanism may continue to print articles during the filling process for the second color ink.

Upon the level of the ink reservoir depleting back to the predetermined or desired low threshold, a next color ink, or one of the first or second color inks, is used to fill the ink reservoir from the low threshold to the full threshold level. Again, the printing mechanism may continue to print articles during the filling process for the next color ink. In this manner, numerous refilling procedures for the ink reservoir may be iterated while continuously printing articles.

As noted above, previous implementations of printing mechanisms require a single color ink to be used to fill a particular ink reservoir during a printing process. However, the first color ink, the second color ink, and/or the next color ink described herein may be used to fill the same ink reservoir. Generally, the first color ink, the second color ink, and the next color ink may be chosen from a palette such that mixing any of these colors does not result in a "mixing-shift" of an unacceptable mix of color.

The term "mixing-shift" refers to a tendency of multiple color inks to mix and form a color having aesthetics that would generally be undesirable for brightly decorated articles of manufacture. The term "mixing-shift" also refers to a tendency of multiple color inks to mix and form a color having aesthetics that would generally be undesirable for uniformly decorated articles of manufacture. The palette from which the first color ink, the second color ink, and the next color ink are chosen is a discrete region of a color space delineated by a horizontal or vertical axis upon that color space whereby any colors chosen within that discrete region of color space do not mix to create a mixed color of an undesirable aesthetic quality.

Accordingly, as described herein, discrete regions of a printing plate may have multiple color inks applied thereon resulting in articles of manufacture decorated with multiple color inks. Due to the continuous nature of the ink refilling procedure and the printing process, a gradient of resulting color is apparent across a plurality of articles. This gradient may be desirable for achieving a kaleidoscope effect of shifting colors while retaining overall print quality and absent functional drawbacks or damage to the underlying printing mechanism. Moreover, the entire printing process is repeatable with multiple desirable gradients being reproducible through the intelligent selection of inks from the regions of the color space described herein.

It should be appreciated that the subject matter presented herein may be implemented as a computer-controlled printing process, a user-controlled printing process, or any other suitable process for decorating articles of manufacture utilizing an offset lithography process. While the subject matter described herein is presented in the general context of one particular arrangement of a printing mechanism, those skilled in the art will recognize that other implementations may be performed in combination with other types of printing mechanisms that may be substantially different in appearance and arrangement of those illustrated herein.

Those skilled in the art will also appreciate that aspects of the subject matter described herein may be practiced in conjunction with other processes for implementing articles of manufacture.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a schematic of a dry offset lithography printing mechanism 100, according to one configuration disclosed herein. As shown, an infeed conveyor 102 transfers articles 108 onto a drum 104. The drum 104 includes one or more mandrels 106 disposed to acquire, support, and rotate the articles 108. The mandrels 106 may include suction, negative airflow, or other forms of attachment to ensure that the articles 108 are securely supported and rotated as necessary.

Generally, the drum 104 rotates in direction 143 about a central axis defined by hub 142. The hub 142 may include bearings or other suitable mechanisms to ensure smooth rotation of the drum 104. The articles 108 may include beverage can blanks, rigid tub blanks, deformable tube blanks, or other articles. The articles 108 may be coated or sealed according to one implementation.

Upon transfer to the mandrels 106, the articles 108 are rotated into contact with printing blankets 128 positioned on the exterior circumference of printing drum 120. As shown, article 110 is partially decorated with ink after coming into contact with blanket 128. Upon transfer of ink to the article 110, a curing stage facilitated by heat, light, or other exposure (e.g., see curing lamp 112) occurs by which ink on the article 110 is cured to form decorated article 114. The decorated articles 114 are then transferred from associated mandrels 106 and onto outfeed conveyor 116.

As illustrated in FIG. 1, the printing drum 120 is configured to rotate in direction 141 about a central axis defined by hub 140. The direction 141 allows each blanket 128 to have ink deposited thereon in a sequential manner from multiple inker assemblies 130. As each blanket passes in contact with an inker assembly 130, ink is deposited onto discrete regions of the blanket defined by a printing plate or transfer plate 126.

For example, each inker assembly 130 includes an ink applicator 122 and an ink reservoir 124 in fluid communication with the ink application 122. As the printing drum 120 rotated about the central axis, ink from the ink reservoir 124 is transferred to the ink applicator 122. The ink applicator 122 applies the received ink onto the printing plate or transfer plate 126. The printing plate may be cylindrical, partially cylindrical, or flat. The printing plate may have the discrete portions for receiving ink defined thereon using one or more coatings to limit transfer of ink onto undesired regions thereon. For example, in a wet offset lithography process, water is used as a coating or "fountain fluid" to limit transfer of ink only to relatively dry portions of the printing plate 126. Alternatively, in a dry offset lithography process, a coating of silicon, silicone, rubber, plastic, or varnish can be used to limit transfer of ink. Other coatings may also be user, depending upon any desired implementation of the mechanism 100.

Once at least partially coated with ink, the printing plate or transfer plate 126 may transfer a partial negative image of a desired decoration onto the printing blanket 128. Through successive applications of ink from each individual applicator assembly 130, a full negative image is formed onto each printing blanket 128. Thereafter, as an article 110 comes into contact with the blanket 128 and is rotated by the associated mandrel 106, the ink is transferred from the blanket onto the article 110. The transferred ink forms a positive image that is then cured in a curing stage as represented by the example curing lamp 112.

As described above, individual articles 108 are transferred from the infeed conveyor onto mandrels 106. The mandrels 106 rotate the articles 110 against the printing blankets 128 to facilitate transfer of ink onto an exterior surface of the articles. Thereafter, the transferred ink is cured and the decorated articles 114 are transferred to the outfeed conveyor 116. Hereinafter, the application of ink onto a printing plate, the transfer of ink from the printing plate to a printing blanket, and the transfer of ink from the printing blanket onto articles, are described more fully with reference to FIGS. 2A-2C.

Figure 2A:
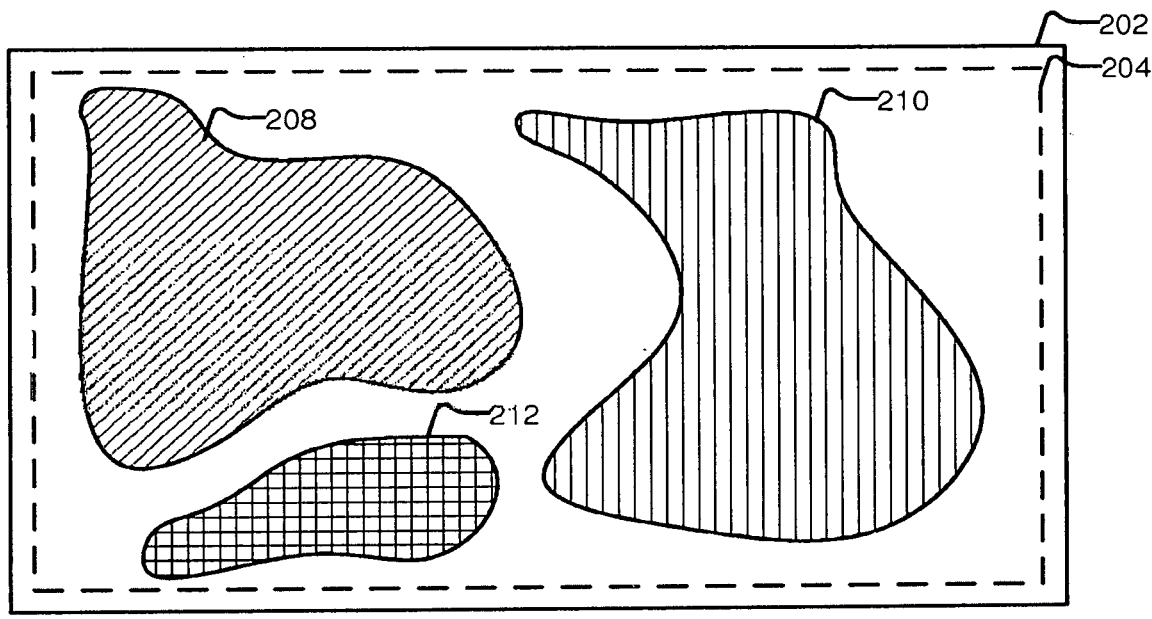
FIG. 2A is a diagram of a printing cylinder or printing plate, according to one configuration disclosed herein.

FIG. 2A is a diagram of a printing cylinder or printing plate 202, according to one configuration disclosed herein. The printing plate 202 may be similar to printing plate 126, according to one implementation. Generally, the printing plate 202 includes a boundary region 204 defining a working area where individual discrete regions may be defined. The plate 202 includes three individual regions 208, 210, and 212 defined thereon and configured to receive ink. However, it is readily understood that more or fewer regions may be included. Furthermore, regions of differing shape may also be formed. Thus, the particular form of the discrete regions 208, 210, and 212 are non-limiting.

According to the printing processes described herein, each region 208, 210, and 212 are configured to receive ink from a single ink applicator assembly 130. Thus, according to one implementation, a separate printing plate having only an associated region 208, 210, or 212 defined thereon may be arranged in fluid communication with each ink applicator assembly 130. In another implementation, a single form of the printing plate 202 may be produced and coated such that only a single region 208, 210, and 212 is exposed to an associated ink applicator 124. Other variations on transfer of ink to a printing plate 202 are also considered to be within the scope of this disclosure. Upon application of ink onto an associated region 208, 210, and 212, the printing plate 202 may come into contact with a printing blanket such that a negative image is formed thereon.

Figure 2B:
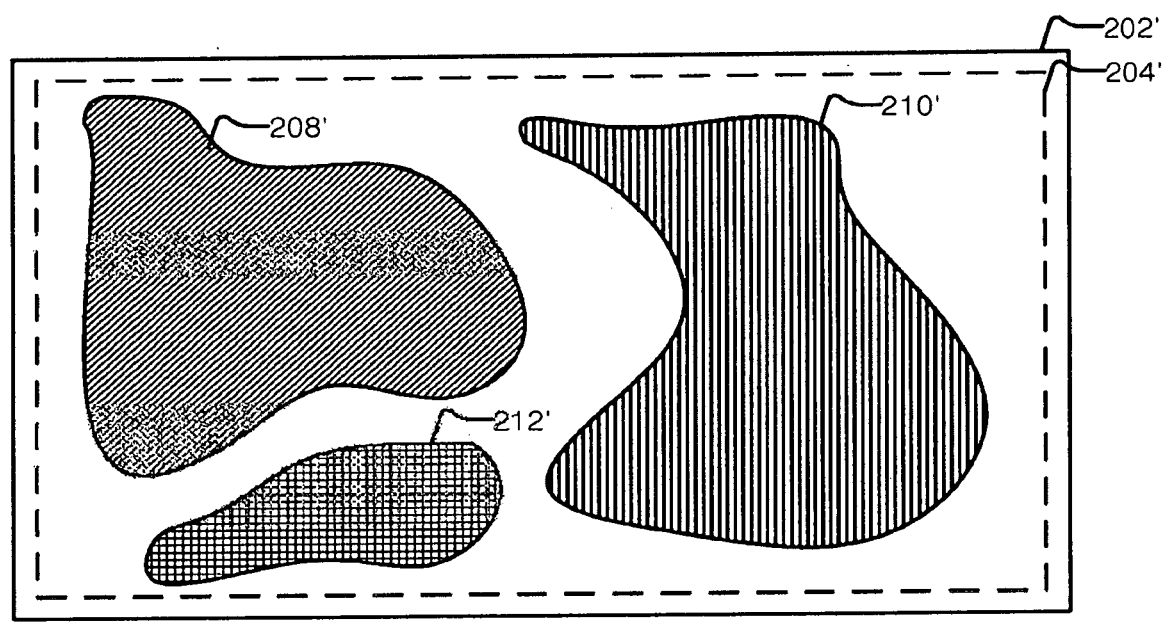
FIG. 2B is a diagram of a blanket having a negative image deposited thereon based on the printing plate of FIG. 2A, according to one configuration disclosed herein.

FIG. 2B is a diagram of a blanket 202' having a negative image deposited thereon based on the printing plate 202 of FIG. 2A, according to one configuration disclosed herein. As shown, regions 208', 210', and 212' form a negative image representative of the discrete regions 208, 210, and 212, respectively. The negative image is within the confines of the boundary 204', and may be used to create a positive image on an article of manufacture, such as a beverage can.

Figure 2C:
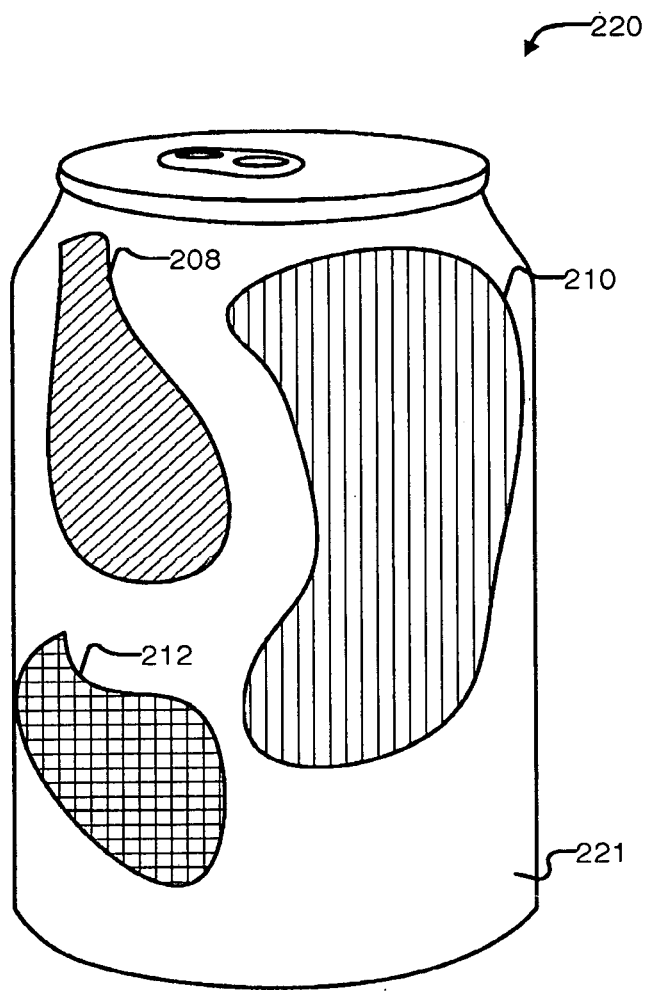
FIG. 2C is an isometric view of a beverage can having a positive image deposited thereon based on the blanket of FIG. 2B, according to one configuration disclosed herein.

FIG. 2C is an isometric view of a beverage 220 can having a positive image deposited thereon based on the blanket 202' of FIG. 2B, according to one configuration disclosed herein. As illustrated, the beverage can 200 includes an outer cylindrical surface 221. The outer cylindrical surface 221 includes the positive image representative of the image defined by the printing blanket 202 deposited and cured thereon. The positive image includes regions 208, 210, and 212. It is understood that although shown as a completed beverage can 220, other articles of manufacture are also applicable to this disclosure. For example, rigid metal structures having a surface for deposition of ink are applicable to this disclosure. The rigid metal structures may include sealed, coated, or non-coated outer surfaces for deposition of ink. Furthermore, deformable metal structures are also applicable. Moreover, rigid or deformable structures made from many materials such as plastic, polyethylene terephthalate (PET), cardboard, paperboard, and other materials are also applicable. Even further, plastic or flexible film substrates for labeling of articles are also applicable. Accordingly, although the beverage can 220 is representative of one such implementation, the particular form illustrated is non-limiting of all embodiments and modifications of the processes described herein.

As described above, ink may be transferred from an ink transfer assembly 130 onto a printing plate 202, the ink may be transferred from the printing plate 202 onto a printing blanket 202', and thereafter, the ink may be transferred from the printing blanket 202' onto an article of manufacture 220. In addition, the particular ink that is transferred according to this process may be continually changed such that a color gradient within each region 208, 210, or 212 may be achieved. Filling and refilling of ink reservoirs 124 for individual ink applicator assemblies 130 to achieve decoration with multiple color inks is described more fully below with reference to FIGS. 3A-3C.

Figure 3A:
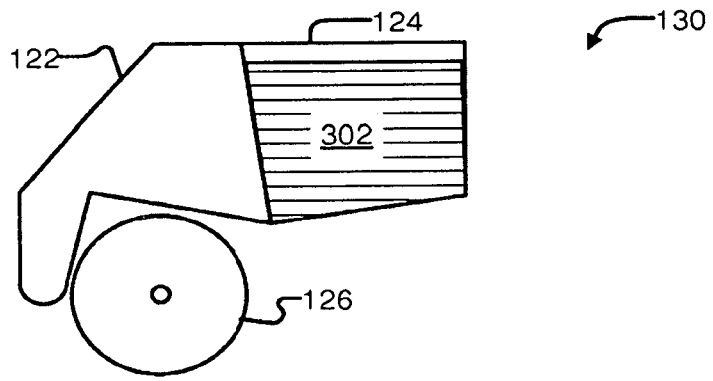
FIG. 3A illustrates an ink reservoir filled with a first color ink, according to one configuration disclosed herein.
Figure 3B:
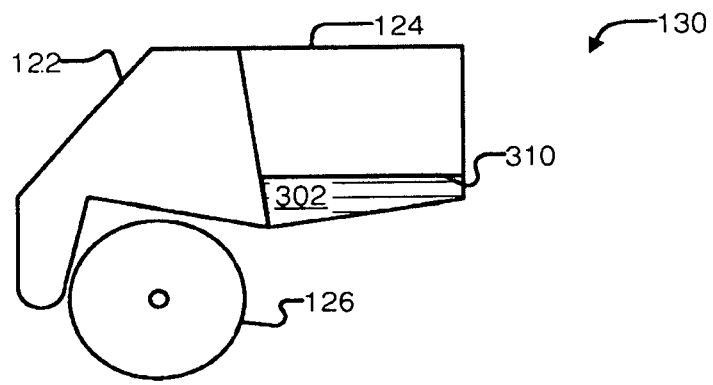
FIG. 3B illustrates an ink reservoir filled with a depleted level of the first color ink, according to one configuration disclosed herein.
Figure 3C:
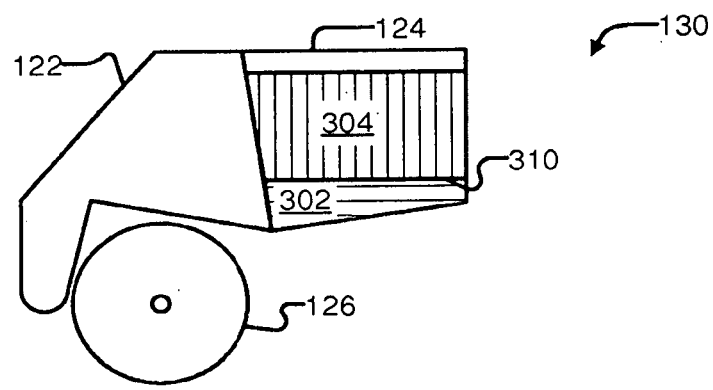
FIG. 3C illustrates an ink reservoir filled with a first color ink and a second color ink, according to one configuration disclosed herein.

FIG. 3A illustrates an ink reservoir filled with a first color ink, according to one configuration disclosed herein. As shown, the first color ink 302 is disposed within the ink reservoir 124. The ink reservoir 124 is in fluid communication with the ink applicator 122. As the printing mechanism 100 processes articles 108 to create decorated articles 114, the amount of the first color ink 302 is depleted, as shown in FIG. 3B. Once the level of the first color ink 302 is depleted to a low threshold level 310, a second or next color ink 304 may be added to the reservoir 124 as illustrated in FIG. 3C.

The second or next color ink 304 may be chosen from an area of a color space that results in a mixed color absent undesirable "mixing-shift," as described above. Furthermore, as the printing mechanism 100 continues to process articles 108 to create decorated articles 114, the ink reservoir 124 may be continually refilled with multiple color inks chosen from the color space as described herein. Thus, a plurality of decorated articles 114 having multiple color inks deposited thereon may be formed. Hereinafter, selection of the second or next color ink, based on the first color ink, is described more fully with reference to FIG. 4.

Figure 4:
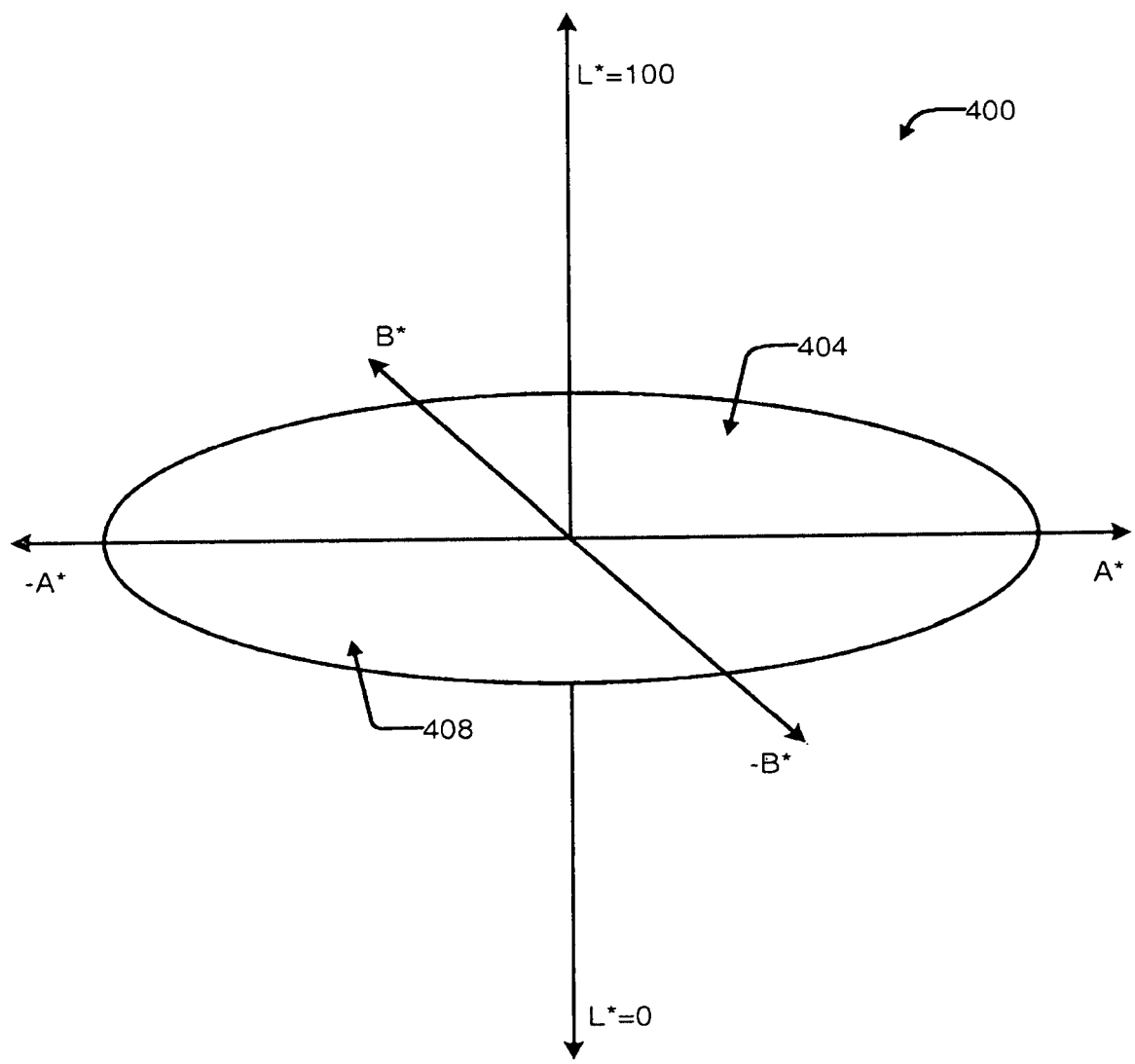
FIG. 4 is a diagram that shows a color space represented in three dimensions.

FIG. 4 is a diagram that shows a color space 400 represented in three dimensions. Generally, the color space is divided into two areas 404 and 408. The delineation of the two areas 404 and 408 is based on a central axis A*. Accordingly, if the first color ink is selected from the area 404, the second and next color inks should also be chosen from area 404. Similarly, if the first color ink is selected from the area 408, the second and next color inks should also be chosen from area 408. It is noted that another appropriate delineation between areas 404 and 408 may include separation based on central axis B*. Other delineations may include any arbitrary central axis dividing the color space into two roughly equal portions. According to one example implementation, areas 404 and 408 are exactly equal in area. According to another example implementation, areas 404 and 408 are within 10% of being exactly equal in area. Such separations and delineations for the areas 404 and 408 should be consistent throughout a single printing process and refill cycle. However, such separations and delineations can be changed for new printing cycles.

Thus, utilizing the color selection process based on a color space as described above, multiple color inks may be refilled into a single ink reservoir resulting in a color gradient for decorated articles 114. Hereinafter, methods of producing articles with multiple color inks and associated methods of refilling ink reservoirs are described with reference to FIGS. 5 and 6.

Figure 5:
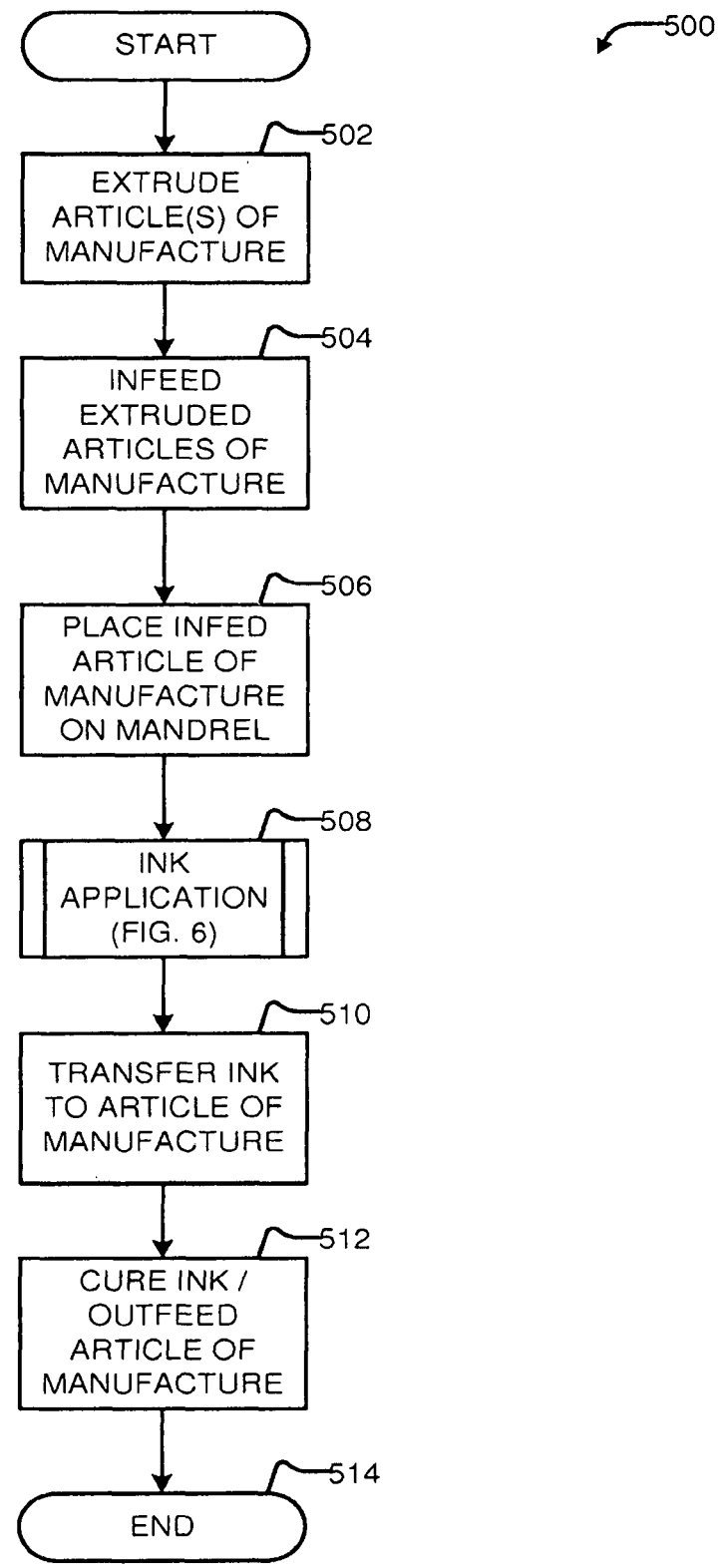
FIG. 5 is a flowchart of a method of producing articles with multiple color inks, according to one configuration disclosed herein.
Figure 6:
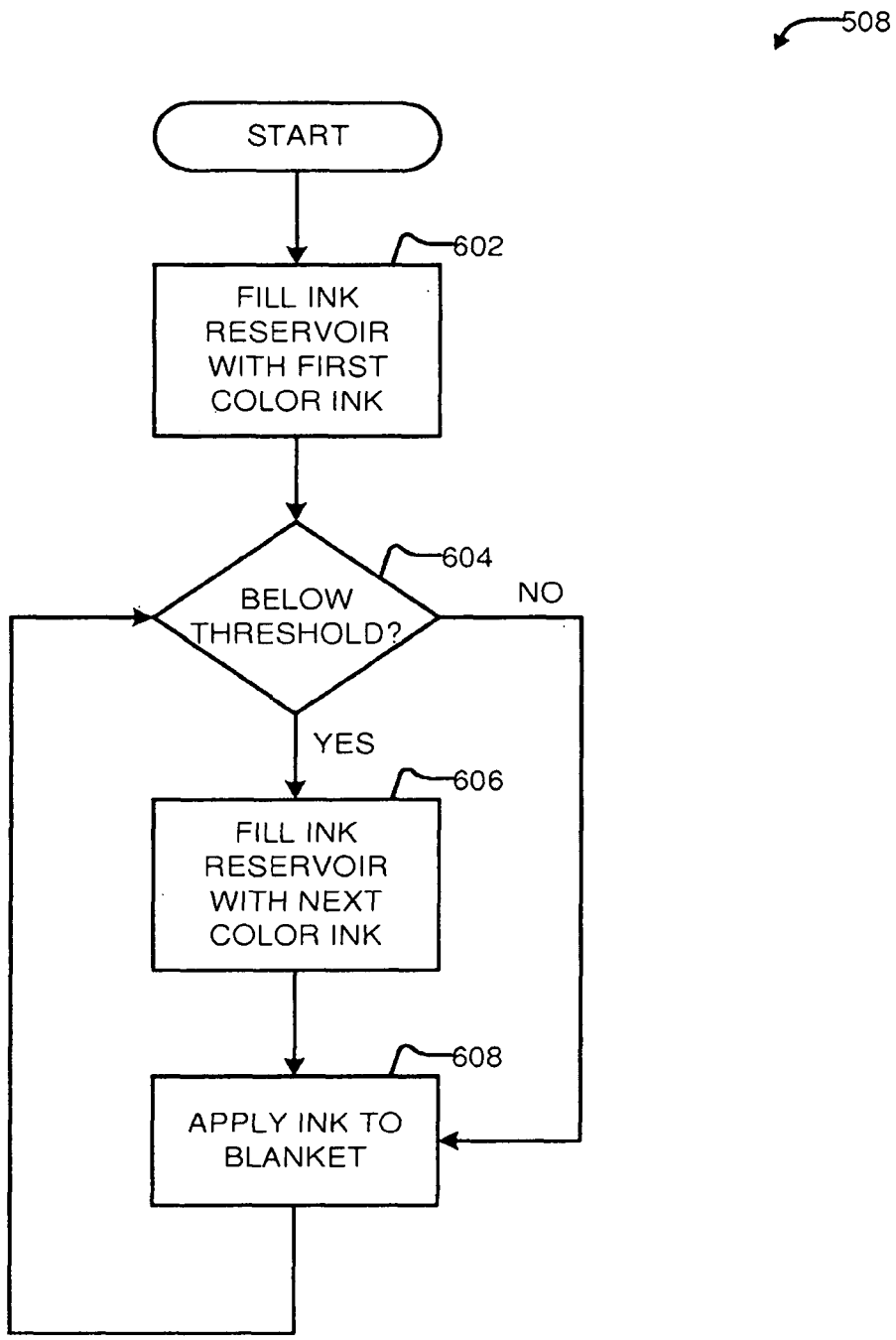
FIG. 6 is a flowchart of a method of filling an ink reservoir with multiple color inks, according to one configuration disclosed herein.

Turning now to FIGS. 5 and 6, additional details will be provided regarding the technologies presented herein for producing articles. It should be appreciated that the operations described herein with regard to FIGS. 5 and 6, and the other FIGS., are implemented (1) as a sequence of computer-controlled printing actions and actions performed by personnel refilling an ink reservoir and/or (2) as interconnected machine logic circuits or circuit modules controlling a printing mechanism. The implementation is a matter of choice dependent on the performance and other requirements of the printing mechanism. Accordingly, the operations described herein are referred to variously as operations, acts, or actions. These operations, acts, and actions may be implemented by software, in firmware, in special purpose digital logic, in tuned mechanical coordination, and any combination thereof, including with or without visual indication that an ink reservoir should be refilled with a second or next color ink by associated personnel. It should also be appreciated that more or fewer operations may be performed than shown in the figures and described herein. These operations may also be performed in parallel, or in a different order than those described herein unless particularly noted otherwise.

FIG. 5 is a flowchart of a method 500 of producing articles with multiple color inks, according to one configuration disclosed herein. The method 500 includes extrusion or creation of articles of manufacture, at block 502. For example, a beverage can may be punched, formed, and extruded into a generally cylindrical shape. Similarly, a rigid metal container may be punched, formed, and extruded. Other production techniques dependent upon actual materials may also be applicable.

Upon creation of the article, the articles may be input to a printing mechanism 100 with an infeed conveyor or conveyance 102, at block 504. The infeed conveyor 102 can take any suitable form, and may be arranged to transfer articles as described above. Thereafter, articles are placed from the infeed conveyor 102 onto mandrels 106, at block 506. Ink is applied onto an exterior surface of the articles at blocks 508 and 510. It is noted that block 508 includes a continuous ink refill process that is described more fully with reference to FIG. 6.

Thereafter, the applied ink is cured in a curing process, at block 512, and the method 500 ceases at block 514. The curing process may include a ultraviolet (UV) light curing process or a heat curing process. Other curing processes may also be applicable. The method 500 may also continuously iterate such that a desired volume of articles are decorated with multiple color inks. Turning now to FIG. 6, the continuous ink refill process is described in more detail.

FIG. 6 is a flowchart of a method 508 of filling an ink reservoir with multiple color inks, according to one configuration disclosed herein. The method 508 includes filling an ink reservoir with a first color ink, at block 602. The first color ink may be chosen from a first area of a color space as illustrated in FIG. 4. During the printing process described in FIG. 5, the ink reservoir may become depleted. Upon the ink level falling to or below a low threshold as determined at block 604, the ink reservoir may be refilled with a second or next color ink at block 606. The second or next color ink is selected from the first area of the color space. This selection should allow mixing of the first color and the second or next color, absent undesirable mixing-shift. Thereafter, the ink is applied to the printing blanket 128 at block 608. As illustrated, the method 508 iterates such that multiple color inks are filled into the reservoir and a desirable color gradient is produced on resulting articles 114.

Based on the foregoing, it should be appreciated that technologies for producing articles with multiple color inks and, potentially, other aspects of the operation of a printing mechanism have been presented herein. Moreover, although the subject matter presented herein has been described in language specific to a particular printing mechanism and methodological acts, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A printing process, comprising:
continuously refilling an ink reservoir with multiple color inks in a sequential manner in response to the ink reservoir attaining a low threshold ink level, wherein the multiple color inks are miscible and are permitted to mix inside the ink reservoir; and
continuously applying the multiple color inks from the ink reservoir onto articles of manufacture to create decorated articles of manufacture.

2. The printing process of claim 1, further comprising: curing the decorated articles of manufacture.

3. The printing process of claim 1, wherein the multiple color inks are selected from a first defined region of a color space to reduce or minimize mixing-shift.

4. The printing process of claim 1, wherein the articles of manufacture are beverage can blanks.

5. The printing process of claim 1, wherein the printing process is a dry offset lithography printing process.

6. A method of producing articles of manufacture with multiple color inks, comprising:
placing a first article of manufacture onto a first mandrel of a transfer drum, the transfer drum being configured to rotate the first mandrel in a first direction towards a printing drum;
transferring a first color ink from a first ink reservoir onto the first article of manufacture;
placing a second article of manufacture onto a second mandrel of the transfer drum, the transfer drum being configured to rotate the second mandrel in the first direction; and
transferring a second color ink from the first ink reservoir onto the second article of manufacture;
wherein the first color ink and the second color ink are miscible and are permitted to mix inside the first ink reservoir, and are selected from a first defined region of a color space to reduce or minimize mixing-shift.

7. The method of claim 6, wherein the first article of manufacture and the second article of manufacture are beverage can blanks.

8. The method of claim 6, wherein the transfer drum and the printing drum are portions of a dry offset lithography printing mechanism.

9. The method of claim 6, wherein transferring the first color ink from the first ink reservoir onto the first article of manufacture comprises:
transferring the first color ink from the first ink reservoir onto a first defined region of a printing plate;
transferring the first color ink from the first defined region onto a printing blanket; and
transferring the first color ink from the printing blanket onto the first article of manufacture.

10. The method of claim 9, wherein transferring the second color ink from the first ink reservoir onto the second article of manufacture comprises:
transferring the second color ink from the first ink reservoir onto the first defined region of a printing plate;
transferring the second color ink from the first defined region onto a printing blanket; and
transferring the second color ink from the printing blanket onto the second article of manufacture.

11. The method of claim 6, further comprising:
curing the first color ink on the first article of manufacture and curing the second color ink on the second article of manufacture.

12. A method of producing articles of manufacture with multiple color inks, comprising:
transferring a first color ink from a first ink reservoir onto a first article of manufacture; and
transferring a second color ink from the first ink reservoir onto a second article of manufacture, wherein the first color ink and the second color ink are miscible and are permitted to mix inside the first ink reservoir, and are selected from a first defined region of a color space.

13. The method of claim 12, further comprising continuously refilling the first ink reservoir with the first color ink and the second color ink in a sequential manner.

14. The method of claim 12, wherein the first article of manufacture and the second article of manufacture are beverage can blanks.

15. The method of claim 12, wherein the first ink reservoir is an ink reservoir on a dry offset lithography printing mechanism.

16. The method of claim 12, wherein transferring the first color ink from the first ink reservoir onto the first article of manufacture comprises:
   transferring the first color ink from the first ink reservoir onto a first defined region of a printing plate;
   transferring the first color ink from the first defined region onto a printing blanket; and
   transferring the first color ink from the printing blanket onto the first article of manufacture.

17. The method of claim 16, wherein transferring the second color ink from the first reservoir onto the second article of manufacture comprises:
   transferring the second color ink from the first ink reservoir onto the first defined region of a printing plate;
   transferring the second color ink from the first defined region onto a printing blanket; and
   transferring the second color ink from the printing blanket onto the second article of manufacture.

18. The method of claim 12, further comprising:
   curing the first color ink on the first article of manufacture and curing the second color ink on the second article of manufacture.

19. A dry offset lithography process for decorating articles of manufacture with multiple color inks, characterized in that a first ink reservoir is continuously refilled with the multiple color inks in a sequential manner, further characterized in that the first ink reservoir is not fully emptied of the multiple color inks during printing, the process comprising:
   placing a first article of manufacture onto a mandrel;
   rotating the mandrel to transfer a first color ink from the first ink reservoir onto the first article of manufacture;
   placing a second article of manufacture onto the mandrel; and
   rotating the mandrel to transfer a second color ink from the first ink reservoir onto the second article of manufacture,
   wherein the first color ink and the second color ink are miscible and are permitted to mix inside the first ink reservoir.

* * * * *